US011343839B2

(12) United States Patent
Wang et al.

(10) Patent No.: US 11,343,839 B2
(45) Date of Patent: *May 24, 2022

(54) DEVICES AND METHODS FOR UPLINK CONTROL CHANNEL DESIGN IN REGULAR BURSTS FOR NEW RADIO (NR)

(71) Applicant: QUALCOMM Incorporated, San Diego, CA (US)

(72) Inventors: Renqiu Wang, San Diego, CA (US); Hao Xu, Beijing (CN); Wanshi Chen, San Diego, CA (US); Yi Huang, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,535

(22) Filed: Dec. 11, 2019

(65) Prior Publication Data

US 2020/0120705 A1 Apr. 16, 2020

Related U.S. Application Data

(63) Continuation of application No. 15/705,175, filed on Sep. 14, 2017, now Pat. No. 10,542,558.

(Continued)

(51) Int. Cl.
*H04W 72/12* (2009.01)
*H04L 5/00* (2006.01)
*H04W 72/04* (2009.01)

(52) U.S. Cl.
CPC ....... *H04W 72/1284* (2013.01); *H04L 5/0082* (2013.01); *H04L 5/0092* (2013.01);
(Continued)

(58) Field of Classification Search
CPC .................. H04L 1/0003; H04B 2201/698
(Continued)

(56) References Cited

U.S. PATENT DOCUMENTS 7,254,393 B2   8/2007  Marque-Pucheu et al.
9,949,275 B2   4/2018  Chen et al.
(Continued)

FOREIGN PATENT DOCUMENTS

CN       103733550 A     4/2014
WO    2015050743 A1      4/2015

OTHER PUBLICATIONS

International Preliminary Report on Patentability—PCT/US2017/051856, The International Bureau of WIPO—Geneva, Switzerland, dated Apr. 11, 2019.
(Continued)

*Primary Examiner* — Kiet M Doan
(74) *Attorney, Agent, or Firm* — Loza & Loza, LLP

(57) ABSTRACT

Wireless communication devices, such as a scheduled entity, are adapted to facilitate uplink transmissions on multiple physical uplink control channels (PUCCHs) of a regular burst period. According to one example, a scheduled entity may obtain a payload for an uplink transmission on a PUCCH. The scheduled entity may subsequently send the uplink transmission utilizing two or more physical uplink control channels (PUCCH) of a regular burst period, where each PUCCH is associated with a different frequency band of the regular burst period. According to one example, a scheduling entity may receive an uplink transmission, where the uplink transmission utilizes a first PUCCH of a regular burst period, and at least a second PUCCH of the regular burst period, each of the first and second PUCCHs being
(Continued)

associated with respectively different frequency bands of the regular burst period. Other aspects, embodiments, and features are also included.

30 Claims, 12 Drawing Sheets

Related U.S. Application Data

(60) Provisional application No. 62/402,451, filed on Sep. 30, 2016.

(52) U.S. Cl.
CPC ... *H04W 72/0413* (2013.01); *H04W 72/1268* (2013.01); *H04W 72/1278* (2013.01); *H04L 5/0044* (2013.01); *H04L 5/0053* (2013.01); *H04W 72/0406* (2013.01); *H04W 72/0446* (2013.01)

(58) Field of Classification Search
USPC .................................. 370/329, 328; 455/450
See application file for complete search history.

(56) References Cited

U.S. PATENT DOCUMENTS

| | | | | |
|---|---|---|---|---|
| 2008/0268860 | A1* | 10/2008 | Lunttila | H04L 1/1887 455/450 |
| 2012/0207040 | A1 | 8/2012 | Comsa et al. | |
| 2013/0039290 | A1 | 2/2013 | Harrison et al. | |
| 2014/0192760 | A1* | 7/2014 | Pajukoski | H04L 5/0046 370/329 |
| 2014/0247796 | A1* | 9/2014 | Ouchi | H04L 5/0053 370/329 |
| 2016/0353440 | A1 | 12/2016 | Lee et al. | |
| 2016/0353500 | A1* | 12/2016 | Choi | H04W 8/005 |
| 2017/0079013 | A1 | 3/2017 | Noh et al. | |
| 2017/0164350 | A1* | 6/2017 | Sun | H04L 5/0007 |
| 2018/0098341 | A1 | 4/2018 | Wang et al. | |

OTHER PUBLICATIONS

International Search Report and Written Opinion—PCT/US2017/051856—ISA/EPO—dated Dec. 12, 2017.

Qualcomm Inc: "Physical Uplink Control Channels", 3GPP Draft, R1-157024 Physical Uplink Control Channels, 3rd Generation Partnership Project (3GPP), Mobile Competence Centre, 650, Route Des Lucioles, F-06921 Sophia-Antipolis Cedex, France, vol. RAN WG1, no. Anaheim, USA, Nov. 15, 2015-Nov. 22, 2015, Nov. 15, 2015 (Nov. 15, 2015), pp. 1-4, XP051003327, Retrieved from the Internet: URL: http://www.3gpp.org/ftp/Meetings_3GPP_SYNC/RAN1/Docs/ [retrieved on Nov. 15, 2015].

Qualcomm Incorporated: "Candidate Frame Structures", 3GPP Draft, R1-162207, Frame Structure Candidates, 3rd Generation Partnership Project (3gpp), Mobile Competence Centre, 650, Route Des Lucioles, F-06921 Sophia-Antipolis Cedex, France, vol. RAN WG1, no. Busan, Korea, Apr. 11, 2016-Apr. 15, 2016, Apr. 2, 2016 (Apr. 2, 2016), XP051080035, Retrieved from the Internet: URL: http://www.3gpp.org/ftp/tsg_ran/WG1_RL1/TSGR1_84b/Docs/.

Qualcomm Incorporated: "Candidate Frame Structures", 3GPP Draft; R1-164695, 3GPP TSG-RAN WG1#85, 3rd Generation Partnership Project (3GPP), Mobile Competence Centre; 650, Route Des Lucioles; F-06921 Sophia-Antipolis Cedex; France, vol. RAN WG1, no. Nanjing, China; May 14, 2016, XP051089940, Retrieved from the Internet: URL:https://www.3gpp.org/ftp/tsg_ran/WG1_RL1/TSGR1_85/Docs/R1-164695.zip [retrieved on May 14, 2016], 8 pages.

Qualcomm Incorporated: "Summary of Email Discussion on Frame Structure", 3GPP Draft; R1-165456_Frame_Structure_Discussion, 3rd Generation Partnership Project (3GPP), Mobile Competence Centre; 650, Route Des Lucioles; F-06921 Sophia-Antipolis Cedex; France, vol. RAN WG1, no. Nanjing, China; May 23, 2016-May 27, 2016, May 24, 2016 (May 24, 2016), pp. 1-28, XP051104210, Retrieved from the Internet: URL: http://www.3gpp.org/ftp/Meetings_3GPP SYNC/RAN1/Docs/ [retrieved on May 24, 2016].

\* cited by examiner

| | |
|---|---|
| +1 | +1 |
| +1 | -1 |
| +1 | +1 |
| +1 | -1 |
| +1 | +1 |
| +1 | -1 |
| +1 | +1 |
| +1 | -1 |
| Sequence 1 | Sequence 2 |

FIG. 13

DEVICES AND METHODS FOR UPLINK CONTROL CHANNEL DESIGN IN REGULAR BURSTS FOR NEW RADIO (NR)

PRIORITY CLAIM

The present Application for Patent is a Continuation of Non-Provisional application Ser. No. 15/705,175 filed in the U.S. Patent and Trademark Office on Sep. 14, 2017, the entire content of which is incorporated herein by reference as if fully set forth below in its entirety and for all applicable purposes. Non-Provisional application Ser. No. 15/705,175 claims priority to and the benefit of provisional patent application No. 62/402,451 filed in the U.S. Patent and Trademark Office on Sep. 30, 2016, the entire content of which is incorporated herein by reference as if fully set forth below in its entirety and for all applicable purposes.

TECHNICAL FIELD

The technology discussed below relates generally to wireless communications, and more specifically to methods and devices for facilitating uplink transmissions on a physical uplink control channel (PUCCH).

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems, orthogonal frequency-division multiple access (OFDMA) systems, etc.

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) new radio (NR) network. As it stands today, 5G NR networks may exhibit a higher degree of flexibility and scalability than LTE, and are envisioned to support very diverse sets of requirements. Therefore, an efficient and flexible manner for a device to determine various aspects of the network upon acquisition is desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the present disclosure are directed to scheduled entities. According to at least one embodiment, a scheduled entity may include a transceiver, a memory, and a processing circuit coupled to the transceiver and the memory. The processing circuit may be adapted to obtain a payload for an uplink transmission on a physical uplink control channel (PUCCH), and to send the uplink transmission via the transceiver utilizing two or more physical uplink control channels (PUCCH) of a regular burst period, wherein each PUCCH is associated with a different frequency band of the regular burst period.

One or more further aspects of the present disclosure include methods of wireless communication as well as scheduled entities including means to perform such methods. One or more examples of such methods may include obtaining a payload for an uplink transmission on a physical uplink control channel (PUCCH), and sending the uplink transmission utilizing two or more physical uplink control channels (PUCCH) of a regular burst period, wherein each PUCCH is associated with a different frequency band of the regular burst period.

Still further aspects of the present disclosure include processor-readable storage medium storing processor-executable programming. In at least one example, the processor-executable programming may be adapted to cause a processing circuit to prepare a payload for an uplink transmission on a physical uplink control channel (PUCCH), and to transmit the uplink transmission utilizing two or more physical uplink control channels (PUCCH) of a regular burst period, wherein each PUCCH is associated with a different frequency band of the regular burst period.

Additional aspects of the present disclosure include scheduling entities. According to at least one example, a scheduling entity may include a transceiver, a memory, and at least one processing circuit communicatively coupled to the transceiver and the memory. The at least one processing circuit may be adapted to receive via the transceiver an uplink transmission from a scheduled entity on a first physical uplink control channel (PUCCH) of a regular burst period, and on at least a second PUCCH of the regular burst period, where the first PUCCH and the second PUCCH are associated with respectively different frequency bands of the same regular burst period.

One or more further aspects of the present disclosure include methods of wireless communication as well as scheduled entities including means to perform such methods. One or more examples of such methods may include receiving an uplink transmission from a scheduled entity on a first physical uplink control channel (PUCCH) of a regular burst period. Further, an uplink transmission may be received from the scheduled entity on at least a second PUCCH of the same regular burst period, where the first PUCCH and the second PUCCH are associated with respectively different frequency bands of the same regular burst period.

Yet further aspects of the present disclosure include processor-readable storage medium storing processor-executable programming. In at least one example, the processor-executable programming may be adapted to cause a processing circuit to receive an uplink transmission from a scheduled entity on a first physical uplink control channel (PUCCH) of a regular burst period, and on at least a second PUCCH of the regular burst period, where the first PUCCH and the second PUCCH are associated with respectively different frequency bands of the same regular burst period.

Other aspects, features, and embodiments associated with the present disclosure will become apparent to those of ordinary skill in the art upon reviewing the following description in conjunction with the accompanying figures.

DRAWINGS

FIG. 13 is a block diagram illustrating two sequences for creating RS tones in the frequency domain.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
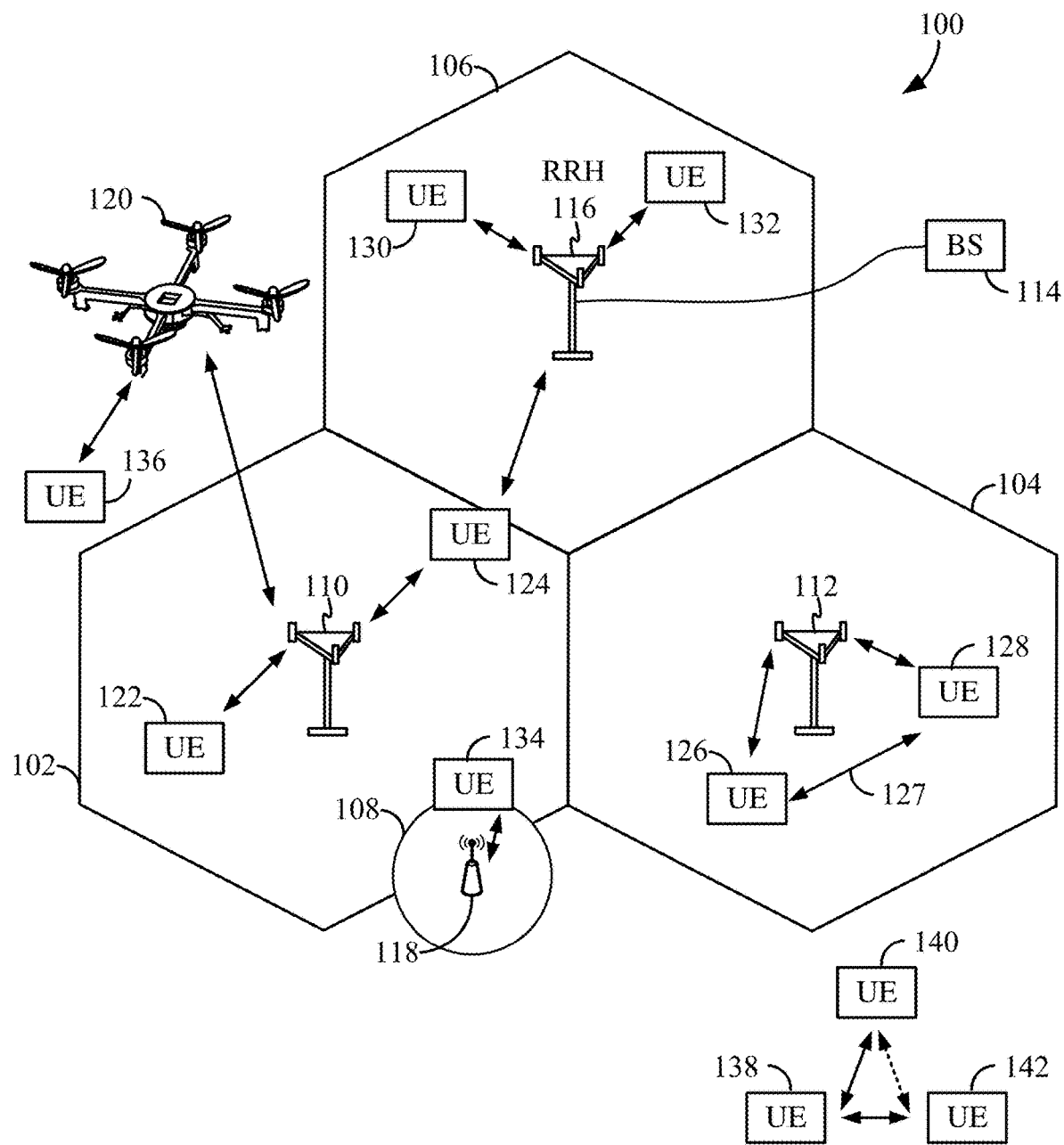
FIG. 1 is a block diagram of a network environment in which one or more aspects of the present disclosure may find application.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a base station (BS) serves each cell. Broadly, a base station is a network element in a radio access network responsible for radio transmission and reception in one or more cells to or from a UE. A base station may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), gNB, or some other suitable terminology.

In FIG. 1, two high-power base stations 110 and 112 are shown in cells 102 and 104, and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120 or other suitably mobile device.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110, UEs 126 and 128 may be in communication with base station 112, UEs 130 and 132 may be in communication with base station 114 by way of RRH 116, UE 134 may be in communication with low-power base station 118, and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 may be functioning as either a scheduling entity or a primary sidelink device, and UEs 140 and 142 may be respectively functioning as either a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Thus, in a wireless communication network with a scheduled access to time-frequency resources and having a cellular configuration, a P2P configuration, and a mesh configuration, a scheduling entity and one or more scheduled entities may communicate utilizing the scheduled resources.

Figure 2:
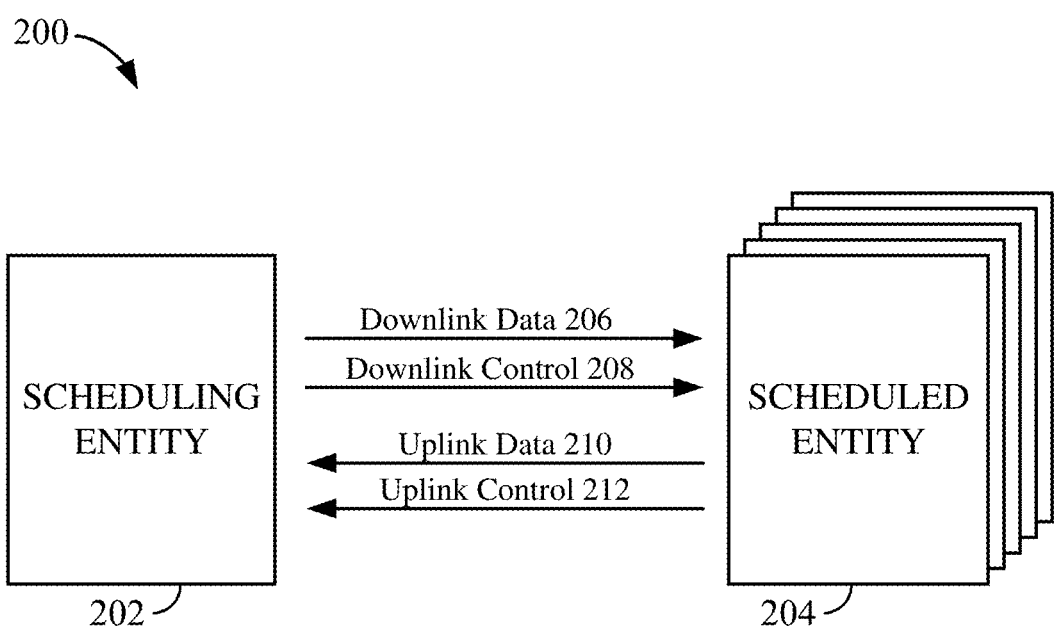
FIG. 2 is a block diagram conceptually illustrating an example of a scheduling entity communicating with one or more scheduled entities according to some embodiments.

Referring now to FIG. 2, a block diagram illustrates a scheduling entity 202 and a plurality of scheduled entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast to one or more scheduled entities 204 control information 208. Uplink data 210 and/or downlink data 206 including one or more data channels, may be additionally transmitted between the scheduling entity 202 and the scheduled entity 204. Transmissions of the control and data information may be organized by subdividing a carrier, in time, into suitable transmission time intervals (TTIs). Furthermore, the scheduled entities 204 may transmit uplink control information 212 including one or more uplink control channels to the scheduling entity 202.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
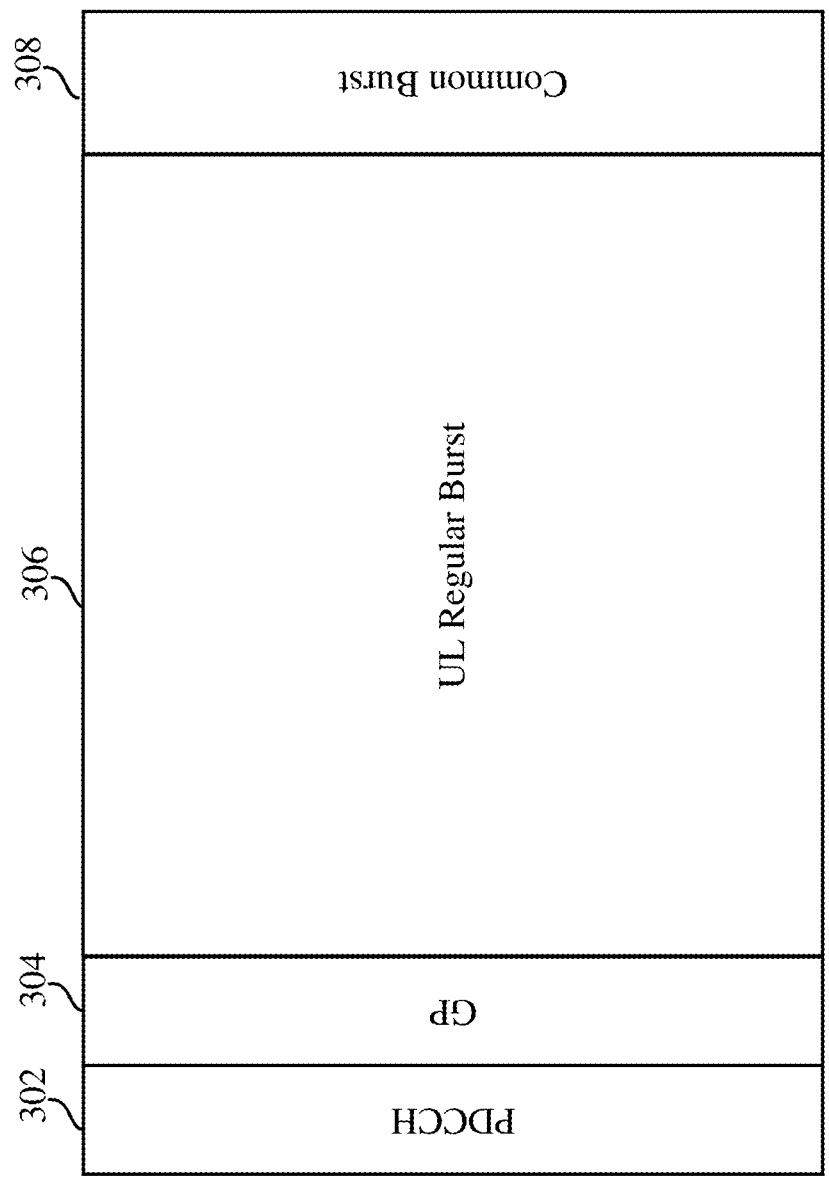
FIG. 3 is a block diagram illustrating a typical frame structure for an uplink transmission on the PUCCH.

A scheduled entity 204 can send uplink control information 212 on a physical uplink control channel (PUCCH), which is received by the scheduling entity 202. FIG. 3 is a block diagram illustrating one example of a frame structure for an uplink transmission on the PUCCH. As shown, the frame includes a physical downlink control channel (PDCCH) 302, followed by a guard period 304. Following the guard period 304 is a period of a regular burst 306, which is followed by a common uplink burst 308. The PDCCH 302 can be one symbol, the guard period 304 can be one symbol, and the common uplink burst 308 can be one symbol. The regular burst 306 can include eleven symbols. The regular burst 306 includes the physical uplink control channel (PUCCH) and/or a physical uplink shared channel (PUSCH). As a scheduled entity 204 sends uplink transmissions, the payload may vary. For example, the payload may be any size from one symbol to multiple symbols, including up to several hundred symbols. In some examples, the common uplink burst 308 may carry uplink control information, including but not limited to data acknowledgments of downlink data, scheduling requests, channel quality information, pilot signals, etc. Although specific numbers of symbols for each portion of the subframe are provided by way of an example, the numbers of symbols for each portion can vary as desired to achieve different goals.

In some uplink transmissions, a scheduled entity 204 may employ all eleven symbols of the regular burst 306. In some instances, a scheduled entity 204 that is configured to send mission critical or ultra-reliable low-latency communications (URLLC) may desire to have a short delay before sending and the communication may desire to have a relatively short duration. Similarly, it may be desirable for a normal scheduled entity 204 to also have a relatively short transmission duration to reduce delay or increase turnaround times.

Aspects of the present disclosure include employing frequency division multiplexing to divide the entire bandwidth of the regular burst period 306 to support multi-channel transmissions, as will be discussed in further detail hereafter.

Figure 4:
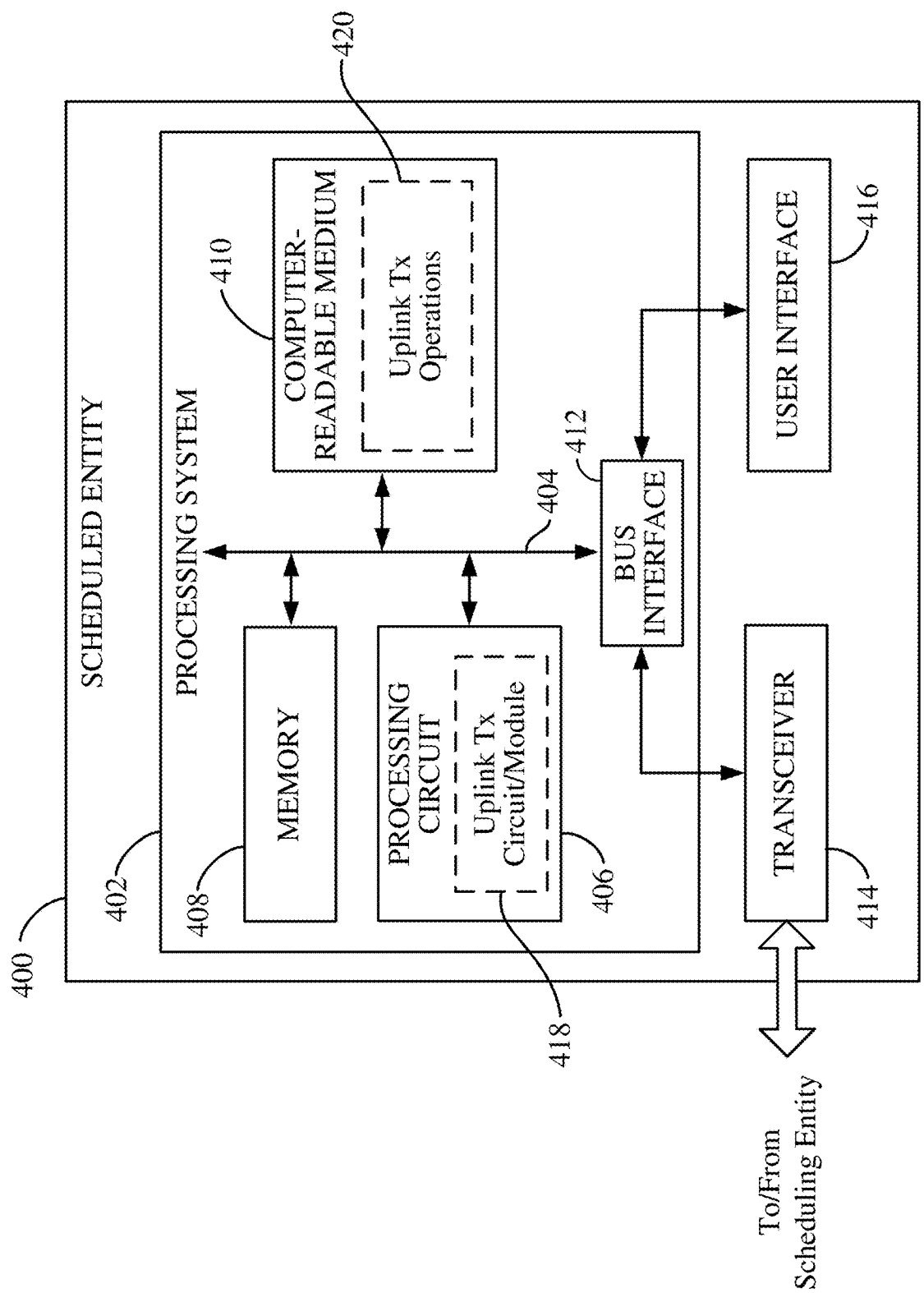
FIG. 4 is a block diagram illustrating select components of a scheduled entity according to at least one example.

FIG. 4 is a block diagram illustrating select components of a scheduled entity 400 employing a processing system 402 according to at least one example of the present disclosure. In this example, the processing system 402 is implemented with a bus architecture, represented generally by the bus 404. The bus 404 may include any number of interconnecting buses and bridges depending on the specific application of the processing system 402 and the overall design constraints. The bus 404 communicatively couples together various circuits including one or more processors (represented generally by the processing circuit 406), a memory 408, and computer-readable media (represented generally by the storage medium 410). The bus 404 may also link various other circuits such as timing sources, peripherals, voltage regulators, and power management circuits, which are well known in the art, and therefore, will not be described any further. A bus interface 412 provides an interface between the bus 404 and a transceiver 414. The transceiver 414 provides a means for communicating with various other apparatus over a transmission medium. Depending upon the nature of the apparatus, a user interface 416 (e.g., keypad, display, speaker, microphone, joystick) may also be provided.

The processing circuit 406 is responsible for managing the bus 404 and general processing, including the execution of programming stored on the computer-readable storage medium 410. The programming, when executed by the processing circuit 406, causes the processing system 402 to perform the various functions described below for any particular apparatus. The computer-readable storage medium 410 and the memory 408 may also be used for storing data that is manipulated by the processing circuit 406 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 406 is arranged to obtain, process and/or send data, control data access and storage, issue commands, and control other desired operations. The processing circuit 406 may include circuitry adapted to implement desired programming provided by appropriate media, and/or circuitry adapted to perform one or more functions described in this disclosure. For example, the processing circuit 406 may be implemented as one or more processors, one or more controllers, and/or other structure configured to execute executable programming and/or execute specific functions. Examples of the processing circuit 406 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 406 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 406 are for illustration and other suitable configurations within the scope of the present disclosure are also contemplated.

In some instances, the processing circuit 406 may include an uplink transmission circuit and/or module 418. The uplink transmission circuit/module 418 may generally include circuitry and/or programming (e.g., programming stored on the storage medium 410) adapted to send an uplink transmission utilizing two or more physical uplink control channels (PUCCH), where each PUCCH is associated with a different frequency band, as described in the present disclosure. As used herein, reference to circuitry and/or programming may be generally referred to as logic (e.g., logic gates and/or data structure logic).

The storage medium 410 may represent one or more computer-readable devices for storing programming, such as processor executable code or instructions (e.g., software, firmware), electronic data, databases, or other digital information. The storage medium 410 may also be used for storing data that is manipulated by the processing circuit 406 when executing programming. The storage medium 410 may be any available non-transitory media that can be accessed by a general purpose or special purpose processor, including portable or fixed storage devices, optical storage devices, and various other mediums capable of storing, containing and/or carrying programming By way of example and not limitation, the storage medium 410 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 410 may be coupled to the processing circuit 406 such that the processing circuit 406 can read information from, and write information to, the storage medium 410. That is, the storage medium 410 can be coupled to the processing circuit 406 so that the storage medium 410 is at least accessible by the processing circuit 406, including examples where the storage medium 410 is integral to the processing circuit 406 and/or examples where the storage medium 410 is separate from the processing circuit 406 (e.g., resident in the processing system 402, external to the processing system 402, distributed across multiple entities).

Programming stored by the storage medium 410, when executed by the processing circuit 406, can cause the processing circuit 406 to perform one or more of the various functions and/or process steps described herein. In at least some examples, the storage medium 410 may include uplink transmission operations 420. The uplink transmission operations 420 are generally adapted to cause the processing circuit 406 to send an uplink transmission utilizing two or more PUCCHs, where each PUCCH is associated with a different frequency band, as described herein.

Thus, according to one or more aspects of the present disclosure, the processing circuit 406 is adapted to perform (independently or in conjunction with the storage medium 410) any or all of the processes, functions, steps and/or routines for any or all of the scheduled entities described herein (e.g., UE 122, 124, 126, 128, 130, 132, 134, 136, 138, 140, and 142, scheduled entity 204, scheduled entity 400). As used herein, the term "adapted" in relation to the processing circuit 406 may refer to the processing circuit 406 being one or more of configured, employed, implemented, and/or programmed (in conjunction with the storage medium 410) to perform a particular process, function, step and/or routine according to various features described herein.

Figure 5:
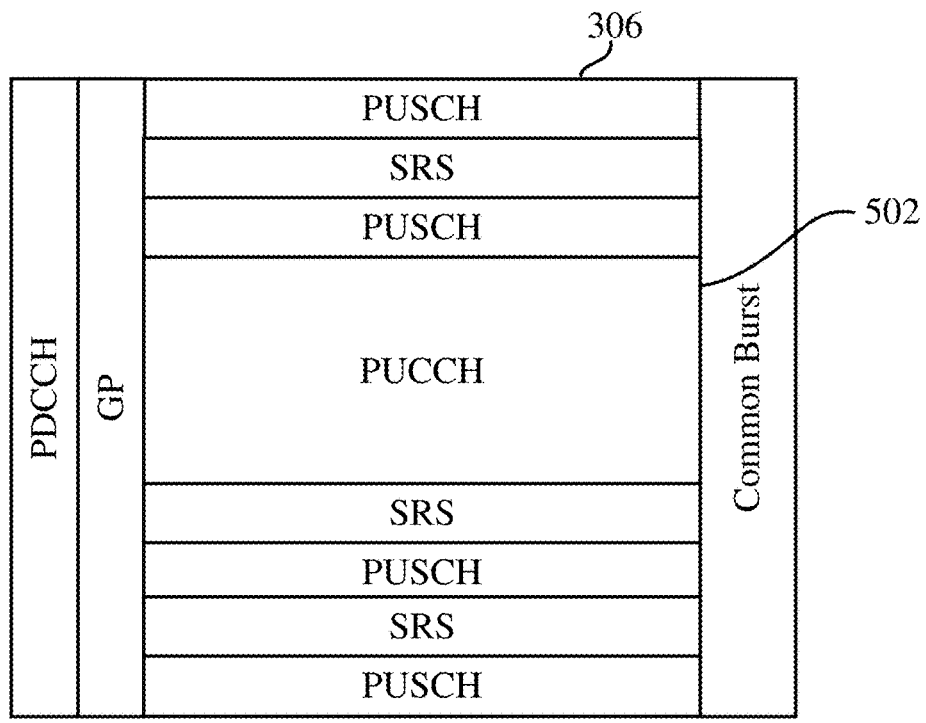
FIG. 5 is a block diagram illustrating one example of a configuration for the regular burst including a single PUCCH region.

As noted previously, the scheduled entity 400 may be configured to employ frequency division multiplexing to send uplink transmissions utilizing two or more PUCCHs, where each PUCCH is associated with a different frequency band. For example, FIG. 5 is a block diagram illustrating one example of a configuration for the regular burst 306. As shown, the regular burst period 306 is divided to include more than one physical uplink shared channel (PUSCH) bands, more than one sounding reference signal (SRS) bands, and a PUCCH region (or band) 502. In some implementations, the PUCCH region 502 may be located relatively central on the frequency band. The relatively central location of the PUCCH region 502 can facilitate a reduced peak-to-average power ratio (PAPR) and/or reduced leakage impact when multiplexed with the other channels. In some implementations, the PUCCH region 502 may be located relatively at the edge on the frequency band.

Figure 6:
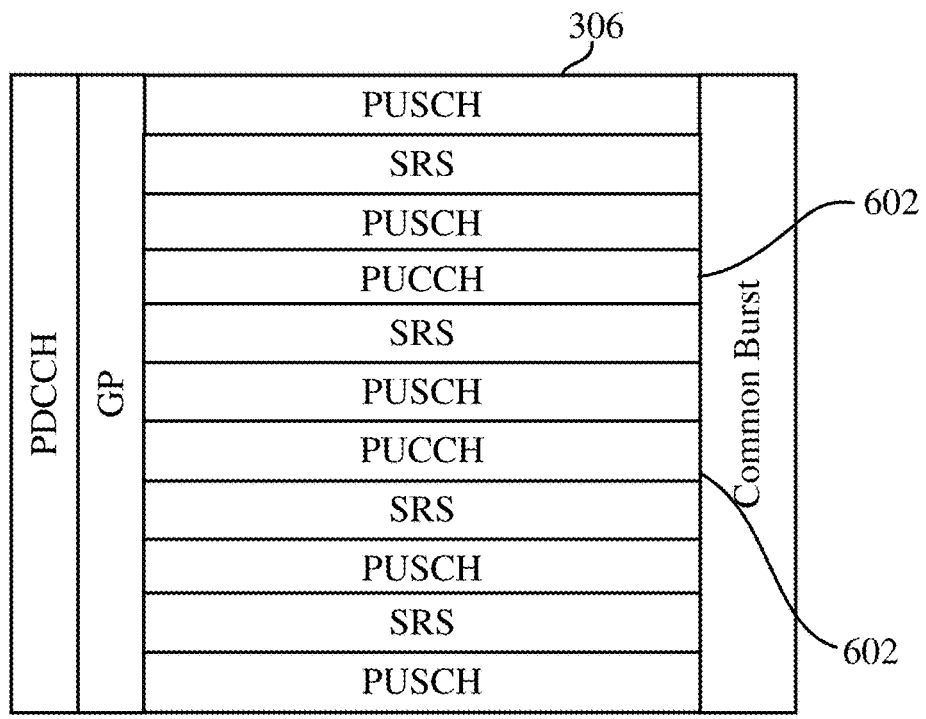
FIG. 6 illustrates a block diagram showing another configuration for the regular burst including a plurality of PUCCH regions.

FIG. 6 illustrates a block diagram showing another configuration for the regular burst 306, including a plurality of PUCCH regions (or bands) 602. In the example depicted in FIG. 6, the PUCCH regions 602 include a relatively narrower bandwidth than the bandwidth associated with the single PUCCH region 502 depicted in FIG. 5. In some implementations, the PUCCH regions 602 may be configured with 5 MHz bandwidth located relatively central on the frequency band. Again, the relatively central location of the PUCCH regions 602 can facilitate a reduced peak-to-average power ratio (PAPR) and/or reduced leakage impact when multiplexed with the other channels.

Figure 7:
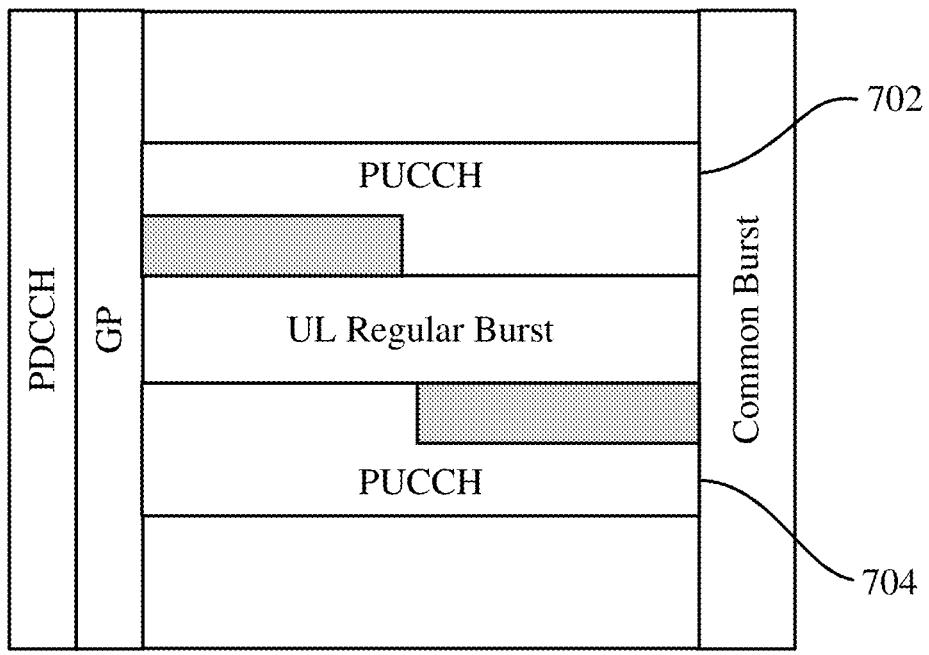
FIG. 7 is a block diagram illustrating an example of a frequency hopping transmission according to at least one implementation.

In some implementations, the multiple PUCCH regions 602 depicted in FIG. 6 may be used for frequency hopping and/or multi-cluster uplink transmissions. For instance, FIG. 7 is a block diagram illustrating an example of a frequency hopping transmission according to at least one implementation. As shown, the scheduled entity 400 can send an uplink transmission including several symbols transmitted on the first PUCCH band 702 and several symbols transmitted on the second PUCCH band 704. For example, the scheduled entity 400 can transmit a first number of symbols using a first resource block (RB) on the first PUCCH band 702. The scheduled entity 400 can then switch (or hop) to the second PUCCH band 704 for transmitting a second number of symbols on a second resource block on the second PUCCH band 704. In one implementation, the scheduled entity 400 may transmit an uneven number of symbols on the two bands, e.g., 5 symbols on the first PUCCH band 702 and 6 symbols on the second PUCCH band 704. The number of symbols on each band may depend on the total number of symbols available for the PUCCH.

Figure 8:
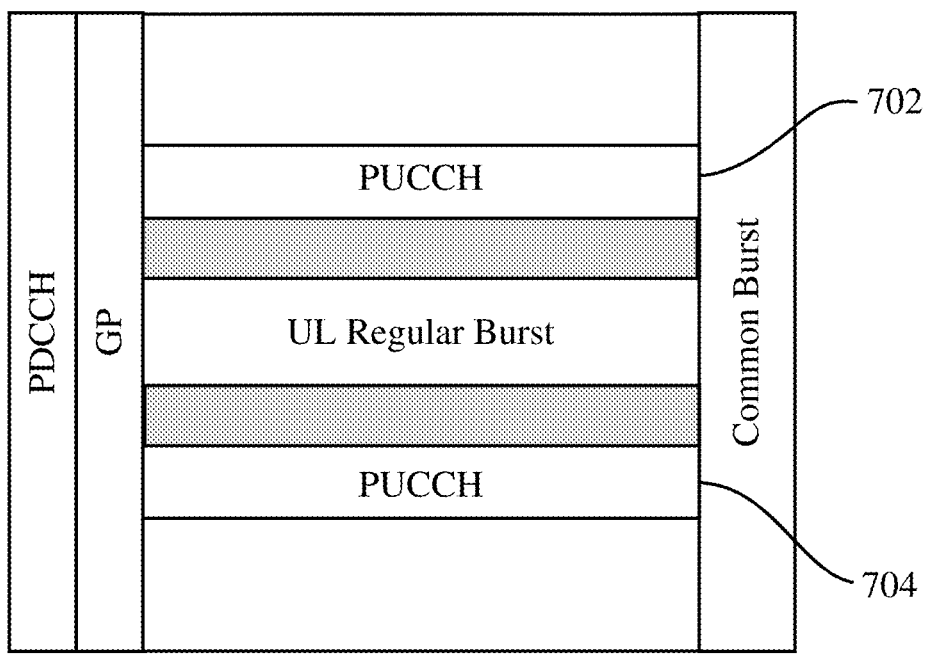
FIG. 8 is a block diagram illustrating an example of a multi-cluster transmission according to at least one implementation.

FIG. 8 is a block diagram illustrating an example of a multi-cluster transmission according to at least one implementation. As shown, the scheduled entity 400 can send uplink transmissions using a respective resource block on each of the first and second PUCCH bands 702, 704, where the transmissions on each of the PUCCH bands overlap at least partially in time.

Figure 9:
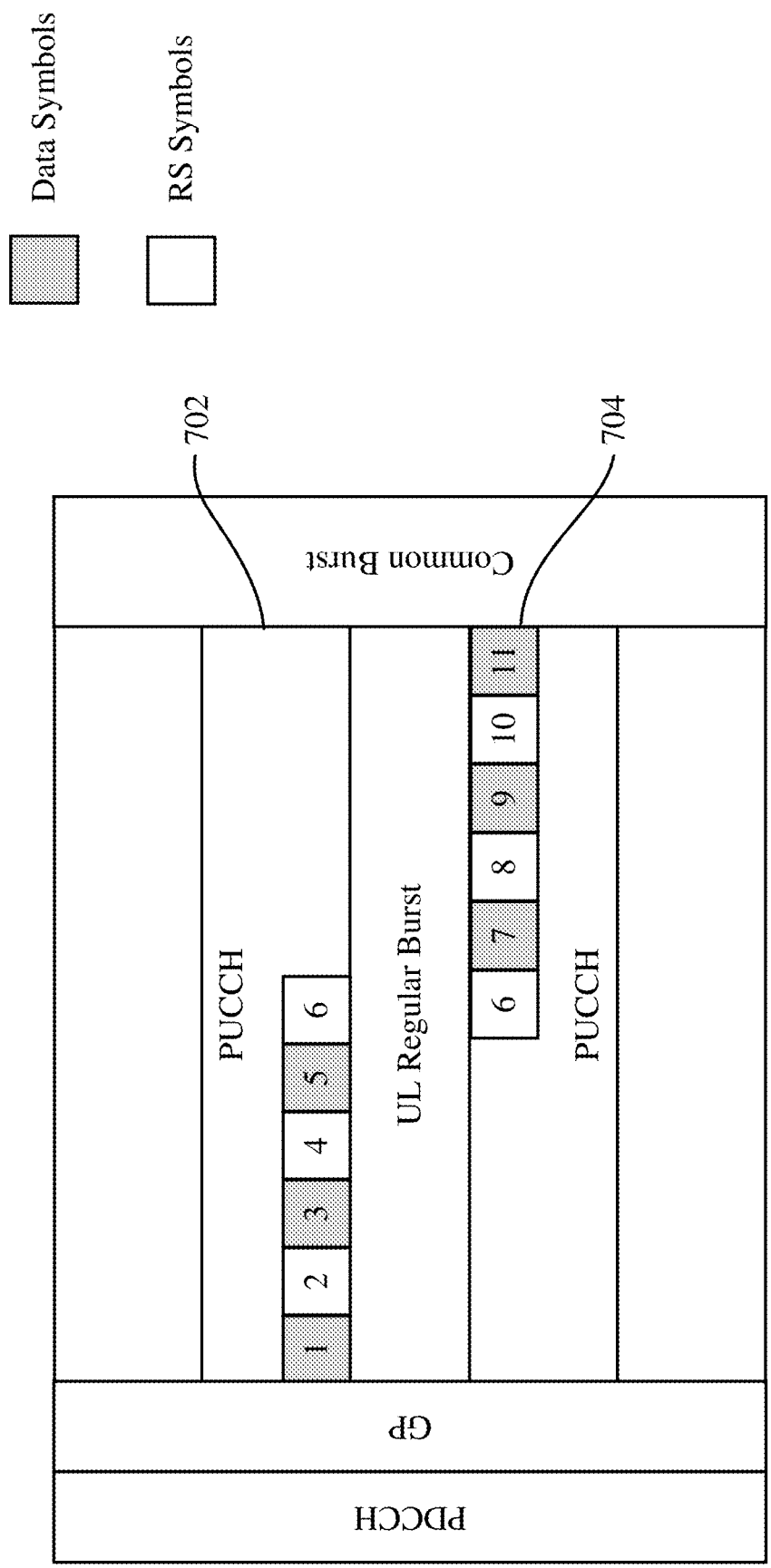
FIG. 9 is a block diagram illustrating an example of a transmission employing aspects of both frequency hopping and multi-cluster described above.

FIG. 9 is a block diagram illustrating an example of a transmission employing aspects of both frequency hopping and multi-cluster described above. As shown, the scheduled entity 400 may send an uplink transmission including several symbols transmitted on the first PUCCH band 702 and several symbols transmitted on the second PUCCH band 704, where at least one symbol associated with each band overlap. More specifically, the scheduled entity 400 can send an uplink transmission on the first PUCCH band 702 utilizing the first six symbols of the eleven-symbol burst, and an uplink transmission on the second PUCCH band 704 utilizing the last six symbols of the eleven-symbol burst. In the depicted example, the data symbols and the reference signal (RS) symbols are shown as alternating with the data symbols. Specifically, the first, third, and fifth symbols on the first PUCCH band 702 are transmitted as data symbols, and the second, fourth, and sixth symbols are transmitted as reference signal (RS) symbols. Further, the sixth, eighth, and tenth symbols transmitted on the second PUCCH band 704 are transmitted as reference signal (RS) symbols, and the seventh, ninth, and eleventh symbols are transmitted as data symbols. As depicted, the sixth symbol on the first PUCCH band 702 and on the second PUCCH band 704 are both utilized by the scheduled entity 400 to send an uplink transmission. In this example, the sixth symbol on each band is transmitted as a RS symbol. In some examples, the sixth symbol may be present on the first band and not on the second band. In various examples, the RS symbols and the data symbols may be interchangeable. For example, the first, third, and fifth symbols on the first PUCCH band 702 may be transmitted as RS symbols, and the second fourth, and sixth symbols may be transmitted as data symbols in the depicted embodiment. In still other examples, the RS symbols and the data symbols may be grouped together, such as in the example shown in FIG. 10 described below.

Figure 10:
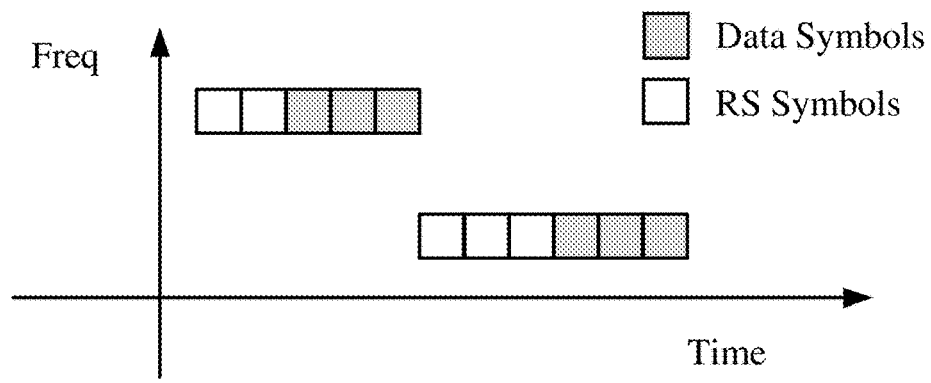
FIG. 10 shows an example of a frame structure for transmitting a relatively small payload (e.g., below the first threshold) on two PUCCH bands using frequency hopping.
Figure 11:
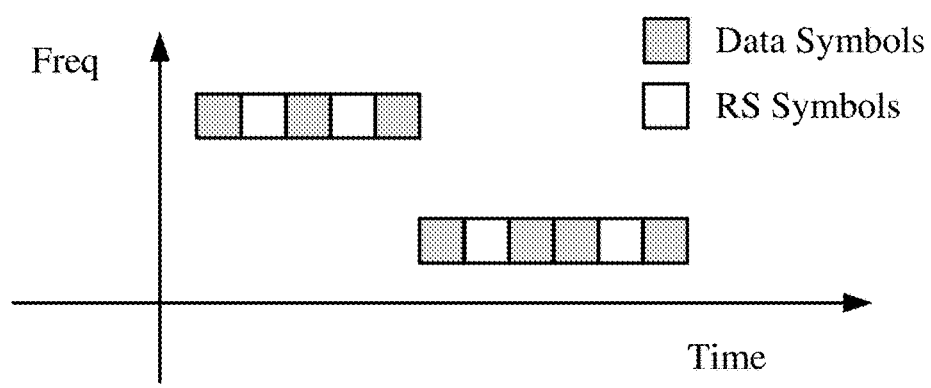
FIG. 11 shows an example of a frame structure for transmitting a relatively medium sized payload (e.g., above the first threshold and below the second threshold) on two PUCCH bands using frequency hopping.
Figure 12:
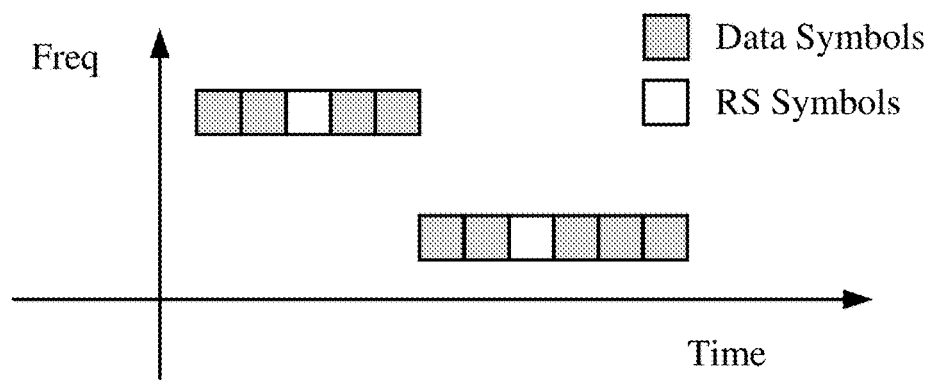
FIG. 12 shows an example of a frame structure for transmitting a relatively large payload (e.g., above the second threshold) on two PUCCH bands using frequency hopping.

According to one or more aspects of the present disclosure, the scheduled entity 400 can be configured to select a PUCCH frame structure and/or error coding scheme according to a size of the payload to be transmitted. For example, the scheduled entity 400 may determine whether the size of the payload is below a first threshold, above the first threshold and below a second threshold, or above the second threshold. If the payload is determined to be below the first threshold, the payload size can be determined to be relatively small. FIGS. 10-12 illustrate examples of employing different frame structures based on the determined size of the payload. For instance, FIG. 10 shows an example of a frame structure for transmitting a relatively small payload (e.g., below the first threshold) on two PUCCH bands using frequency hopping as described above. As shown, the small payload can employ a frame structure utilizing a number of RS symbols that is approximately the same number of data symbols. The data symbols and RS symbols may be placed in alternating orders in time domain as depicted in FIG. 9. The data symbols and RS symbols may also be placed together in groups in time domain as depicted in FIG. 10. In this example, the frame structure utilizes five RS symbols and six data symbols. A repetition code may be used for this payload range.

FIG. 11 shows an example of a frame structure for transmitting a relatively medium sized payload (e.g., above the first threshold and below the second threshold) on two PUCCH bands using frequency hopping as described above. As shown, the medium payload can employ the exemplary frame structure utilizing fewer RS symbols compared to the small payload frame structure. In this example, the medium payload frame structure utilizes four RS symbols and seven data symbols. A Reed-Muller code may be used for this payload range.

FIG. 12 shows an example of a frame structure for transmitting a relatively large payload (e.g., above the second threshold) on two PUCCH bands using frequency hopping as described above. As shown, the large payload can employ the exemplary frame structure utilizing fewer RS symbols compared to the small and medium payload frame structures. In this example, the large payload frame structure utilizes two RS symbols and nine data symbols. A tail biting convolutional code (TBCC) or turbo code or LDPC code may be used in this payload range.

Although the examples shown in FIGS. 10-12 are all frequency hopping examples, it should be apparent that similar aspects of utilizing different frame structures and/or error code based on payload size can also be implemented with the multi-cluster examples described above, as well as the combination of multi-cluster and frequency hopping as described above. Further, although only three payload ranges are described, the actual number of payload ranges may vary anywhere from two or more ranges.

In all of the above examples, the scheduled entity 400 is utilizing all eleven symbols of an uplink regular burst with a combination of RS symbols and data symbols. Such transmissions can be considered coherent transmissions, where a receiving device (e.g., scheduling entity 1500) is aware of which symbols are RS symbols and which symbols are data symbols.

In one or more other implementations, the scheduled entity 400 may send an uplink transmission on the PUCCH as a non-coherent transmission, where the receiving device (e.g., scheduling entity 1500) is not aware of whether each symbol is a RS symbol or a data symbol. For example, the scheduled entity 400 may have relatively few symbols to send (e.g., less than all eleven symbols). The scheduled entity 400 may send the few symbols on the PUCCH without following a predetermined sequence of RS symbols. In such instances, the scheduled entity 400 can utilize fewer than all eleven symbols, and another user device can send an uplink transmission on the same PUCCH using those symbols that were not used by the scheduled entity 400.

According to one example, when the scheduled entity 400 has just one symbol to transmit, the scheduled entity 400 can send the single symbol without any RS symbols, and the remaining ten symbols are opened for another user to utilize. If the scheduled entity 400 has more than one symbol for transmission, the scheduled entity 400 may use any combination of RS and data symbols in a non-coherent transmission, without using all eleven symbols.

Figure 13:
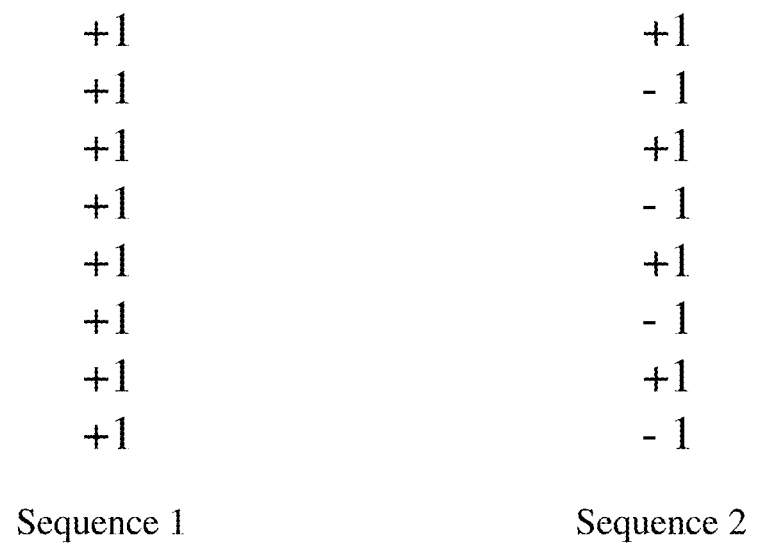

In some implementations, RS (e.g., pilot) tones and data tones can be created in the frequency domain utilizing particularly designed sequences. That is, known RS tones for channel estimation can be created utilizing a base sequence multiplied with different orthogonal covers or with phase ramping. For example, a base sequence may be multiplied with a different orthogonal cover (e.g., walsh cover, discrete fourier transform (DFT) matrix), or carefully designed phase ramping. FIG. 13 is a diagram illustrating two sequences. Sequence 1, on the left of FIG. 13, is all a +1 cover. Sequence 2, on the right of FIG. 13, is a +1 and −1 cover. In such a scenario, every other tone will be RS tones, independent of which sequence is transmitted. In such examples, the scheduling entity may specify a particular base sequence multiplied with different orthogonal covers or with phase ramping to be utilized by the scheduled entity so that known RS tones can be generated by the scheduled entity.

Figure 14:
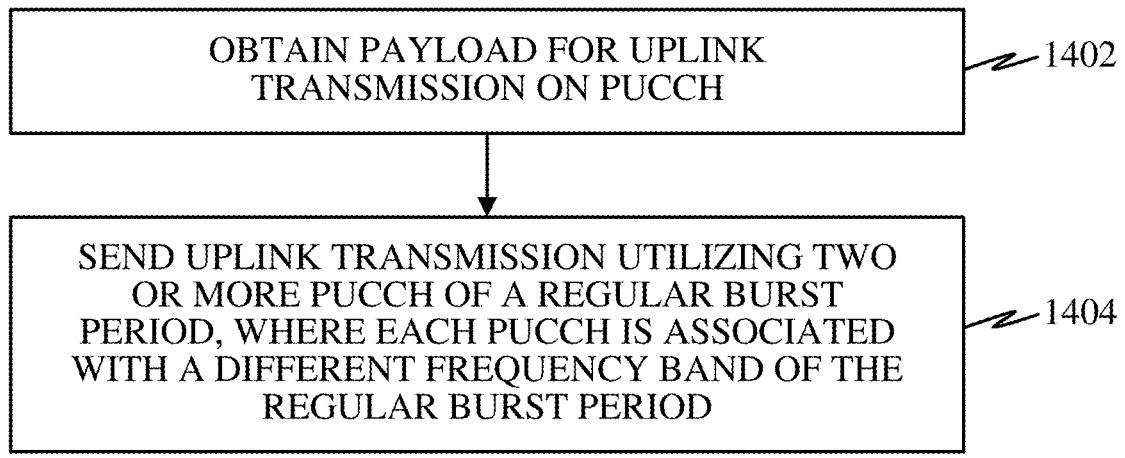
FIG. 14 is a flow diagram illustrating a method operational on a scheduled entity according to at least one example.

FIG. 14 is a flow diagram illustrating at least one example of a method operational on a scheduled entity, such as the scheduled entity 400. Referring to FIGS. 4 and 14, a scheduled entity 400 can obtain a payload for an uplink transmission on a PUCCH at 1402. For example, the processing circuit 406 may include logic (e.g., uplink transmission circuit/module 418, uplink transmission operations 420) adapted to obtain information to be transmitted on a PUCCH.

At 1404, the scheduled entity 400 can send an uplink transmission utilizing two or more PUCCHs of a regular burst period, where each of the respective PUCCHs is associated with a different frequency band of the regular burst period. For example, the processing circuit 406 may include logic (e.g., uplink transmission circuit/module 418, uplink transmission operations 420) adapted to transmit the obtained payload via the transceiver 414 on two or more PUCCHs of a regular burst period, where each respective PUCCH of the plurality of PUCCHs are transmitted on different respective frequency bands of the regular burst period.

As previously discussed herein (e.g., with reference to FIGS. 7 and 9), some implementations of sending the uplink transmission utilizing the two or more PUCCHs may include sending a first portion of the uplink transmission on a first PUCCH associated with a first frequency band of the regular burst period, switching to a second PUCCH associated with a second frequency band of the regular burst period, and then sending a second portion of the uplink transmission on the second PUCCH. In some examples, at least a portion of the second portion of the uplink transmission on the second PUCCH may be sent simultaneous to sending at least a portion of the first portion of the uplink transmission on the first PUCCH, such as in the example depicted in FIGS. 8 and 9.

In some implementations, sending the uplink transmission utilizing the two or more PUCCHs may include simultaneously sending an uplink transmission on a first PUCCH associated with a first frequency band and an uplink transmission on a second PUCCH associated with a second frequency band, such as in the example depicted in FIG. 8.

In some implementations, prior to sending the uplink transmission, the scheduled entity 400 may determine a size of the payload to determine whether it falls within one or more predetermined ranges for payload sizes. For example, the processing circuit 406 may include logic (e.g., uplink transmission circuit/module 418, uplink transmission operations 420) adapted to determine whether a size of the payload is less than a first threshold, greater than or equal to the first threshold and less than or equal to a second threshold, or greater than the second threshold.

In at least one example, a first frame structure and/or a first error code may be employed when the size of the payload is determined to be less than the first threshold. Further, a second frame structure and/or a second error code may be employed when the size of the payload is determined to be greater than or equal to the first threshold and less than or equal to the second threshold. Additionally, a third frame structure and/or a third error code may be employed when the size of the payload is determined to be greater than the second threshold.

In at least one implementation, employing the first frame structure and/or the first error code may include utilizing a number of RS symbols that approximates the number of data symbols.

In one or more implementations, sending the uplink transmission utilizing the two or more PUCCHs may include sending the uplink transmission as a coherent transmission including a predetermined sequence of reference signal (RS) symbols and data symbols. In other implementations, sending the uplink transmission utilizing the two or more PUCCHs may include sending the uplink transmission as a non-coherent transmission.

In some implementations, the scheduled entity 400 may create known RS tones for channel estimates utilizing a base sequence multiplied with different orthogonal covers or with phase ramping, as noted previously herein. For example, the processing circuit 406 may include logic (e.g., uplink transmission circuit/module 418, uplink transmission operations 420) adapted to generate known RS tones for channel estimates utilizing a base sequence multiplied with different orthogonal covers or with phase ramping.

Figure 15:
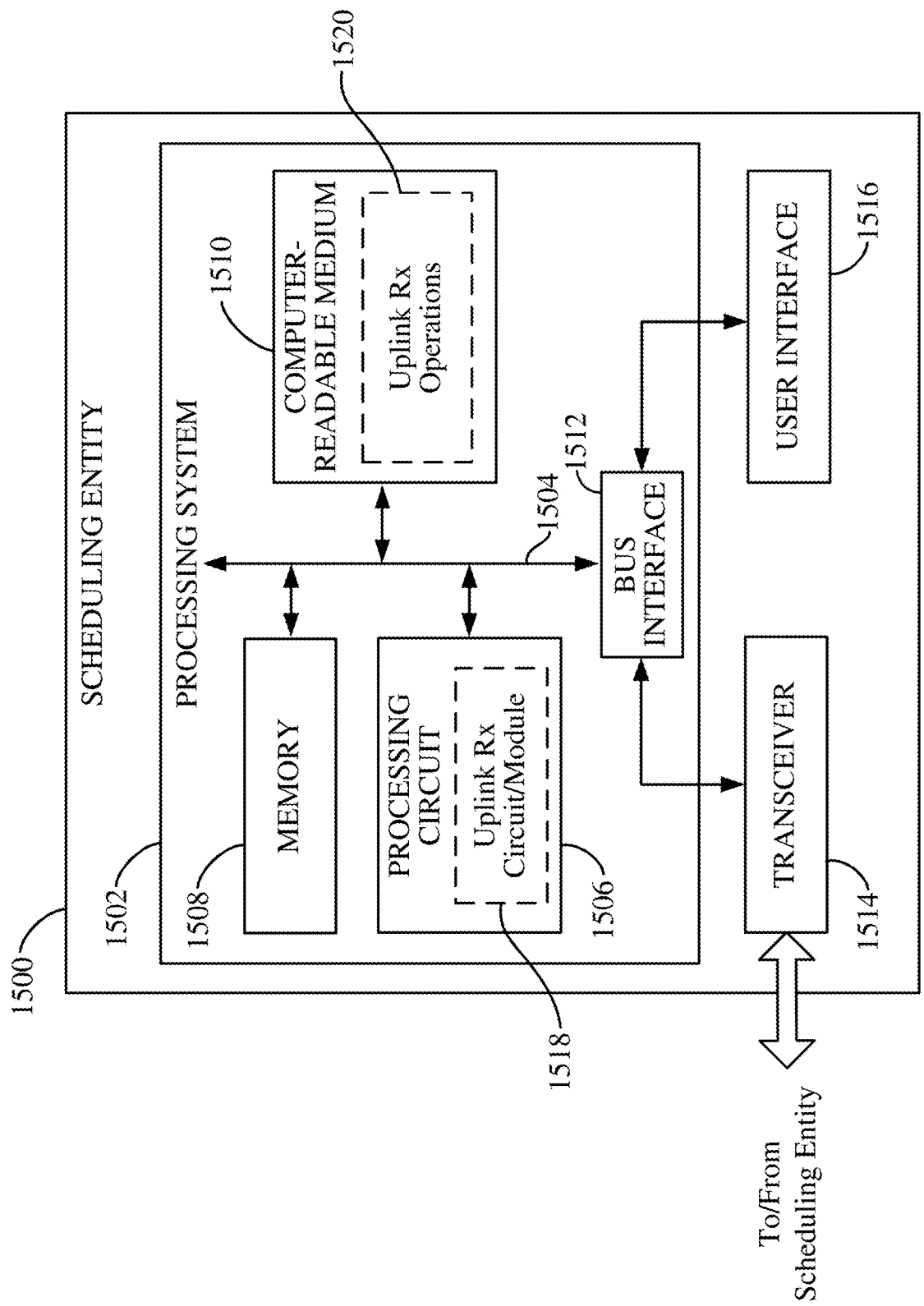
FIG. 15 is a block diagram illustrating select components of a scheduling entity according to at least one example.

Turning now to FIG. 15, a block diagram is shown illustrating select components of a scheduling entity 1500 employing a processing system 1502 according to at least one example of the present disclosure. Similar to the processing system 402 in FIG. 4, the processing system 1502 may be implemented with a bus architecture, represented generally by the bus 1504. The bus 1504 may include any number of interconnecting buses and bridges depending on the specific application of the processing system 1502 and the overall design constraints. The bus 1504 communicatively couples together various circuits including one or more processors (represented generally by the processing circuit 1506), a memory 1508, and computer-readable media (represented generally by the storage medium 1510). The bus 1504 may also link various other circuits such as timing sources, peripherals, voltage regulators, and power management circuits, which are well known in the art, and therefore, will not be described any further. A bus interface 1512 provides an interface between the bus 1504 and a transceiver 1514. The transceiver 1514 provides a means for communicating with various other apparatus over a transmission medium. Depending upon the nature of the apparatus, a user interface 1516 (e.g., keypad, display, speaker, microphone, joystick) may also be provided.

The processing circuit 1506 is responsible for managing the bus 1504 and general processing, including the execution of programming stored on the computer-readable storage medium 1510. The programming, when executed by the processing circuit 1506, causes the processing system 1502 to perform the various functions described below for any particular apparatus. The computer-readable storage medium 1510 and the memory 1508 may also be used for storing data that is manipulated by the processing circuit 1506 when executing programming.

The processing circuit 1506 is arranged to obtain, process and/or send data, control data access and storage, issue commands, and control other desired operations. The processing circuit 1506 may include circuitry adapted to implement desired programming provided by appropriate media in at least one example, and/or circuitry adapted to perform one or more functions described in this disclosure. The processing circuit 1506 may be implemented and/or configured according to any of the examples of the processing circuit 406 described above.

In some instances, the processing circuit 1506 may include an uplink reception (Rx) circuit and/or module 1518. The uplink reception circuit/module 1518 may generally include circuitry and/or programming (e.g., programming stored on the storage medium 1510) adapted to receive uplink transmissions on two or more physical uplink control channels (PUCCH) associated with different frequency bands of a regular burst period, and to communicate with a scheduled entity to facilitate such uplink transmissions, as described herein. As noted previously, reference to circuitry and/or programming may be generally referred to as logic (e.g., logic gates and/or data structure logic).

The storage medium 1510 may represent one or more computer-readable devices for storing programming, such as processor executable code or instructions (e.g., software, firmware), electronic data, databases, or other digital information. The storage medium 1510 may be configured and/or implemented in a manner similar to the storage medium 410 described above.

Programming stored by the storage medium 1510, when executed by the processing circuit 1506, can cause the processing circuit 1506 to perform one or more of the various functions and/or process steps described herein. In at least some examples, the storage medium 1510 may include uplink reception (Rx) operations 1520 adapted to cause the processing circuit 1506 to receive uplink transmissions on two or more physical uplink control channels (PUCCH) associated with different frequency bands of a regular burst period, and to communicate with a scheduled entity to facilitate such uplink transmissions, as described herein. Thus, according to one or more aspects of the present disclosure, the processing circuit 1506 is adapted to perform (independently or in conjunction with the storage medium 1510) any or all of the processes, functions, steps and/or routines for any or all of the scheduled entities described herein (e.g., base station 110, 112, 114, 118, UE 138, quadcopter 120, scheduling entity 202). As used herein, the term "adapted" in relation to the processing circuit 1506 may refer to the processing circuit 1506 being one or more of configured, employed, implemented, and/or programmed (in conjunction with the storage medium 1510) to perform a particular process, function, step and/or routine according to various features described herein.

Figure 16:
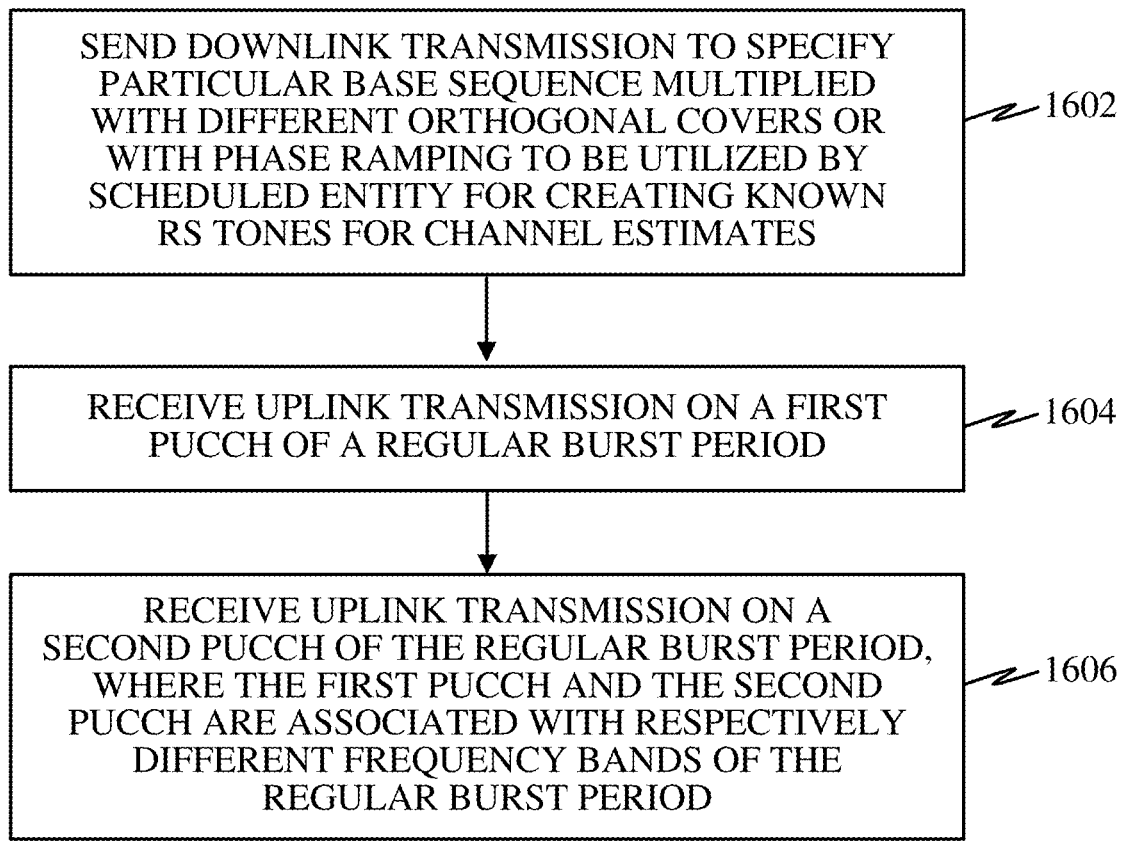
FIG. 16 is a flow diagram illustrating a method operational on a scheduling entity according to at least one example.

FIG. 16 is a flow diagram illustrating at least one example of a method operational on a scheduling entity, such as the scheduling entity 1500. Referring to FIGS. 15 and 16, a scheduling entity 1500 can optionally send a downlink transmission to a scheduled entity at 1602. The downlink transmission may be adapted to specify a particular base sequence multiplied with different orthogonal covers or with phase ramping to be utilized by the scheduled entity for the uplink transmission on the first PUCCH and on the second PUCCH for creating known reference signal (RS) tones for channel estimates, as described previously herein. For example, the processing circuit 1506 may include logic (e.g., uplink reception circuit/module 1518, uplink reception operations 1520) adapted to send a downlink transmission via the transceiver 1514 to a scheduled entity, where the downlink transmission is configured to specify a particular base sequence multiplied with different orthogonal covers or with phase ramping to be utilized for creating known reference signal (RS) tones for channel estimates.

At 1604, the scheduling entity 1500 may receive an uplink transmission from the scheduled entity on a first PUCCH of a regular burst period. Further, at 1606, the scheduling entity 1500 may receive an uplink transmission from the scheduled entity on at least a second PUCCH of the same regular burst period. According to an aspect of the disclosure, the first PUCCH and the second PUCCH are associated with respectively different frequency bands of the regular burst period. In at least one implementation, the processing circuit 1506 may include logic (e.g., uplink reception circuit/module 1518, uplink reception operations 1520) adapted to receive the uplink transmission on the first PUCCH and the uplink transmission on the at least a second PUCCH via the transceiver 1514.

In some implementations, at least a portion of the uplink transmission on the first PUCCH may be received simultaneous to receiving at least a portion of the uplink transmission on the second PUCCH, as noted previously herein.

In one or more implementations, the received uplink transmission on the first and second PUCCHs may include a number of RS symbols approximating a number of data symbols.

In some examples, the received uplink transmissions on the first PUCCH and the second PUCCH may be coherent transmissions including a predetermined sequence of reference signal (RS) symbols and data symbols. In other examples, the received uplink transmissions on the first PUCCH and the second PUCCH may be non-coherent transmissions.

As noted previously herein, the received uplink transmissions on the first PUCCH and the second PUCCH may be formatted with a plurality of RS symbols in alternating format with a plurality of data symbols. In other examples, the plurality of RS symbols may be grouped together and the plurality of data symbols may be grouped together.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within various systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, and 4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A scheduled entity, comprising:
   a transceiver;
   a memory; and
   a processing circuit coupled to the transceiver and the memory, the processing circuit adapted to:
   obtain a payload for an uplink transmission on a physical uplink control channel (PUCCH);
   send a first portion of the uplink transmission including first symbols of the payload via the transceiver on a first PUCCH associated with a first frequency band of a regular burst period to a scheduling entity;
   switch the transceiver to a second PUCCH associated with a second frequency band of the regular burst period; and
   send a second portion of the uplink transmission including last symbols of the payload via the transceiver on the second PUCCH of the regular burst period to the scheduling entity.

2. The scheduled entity of claim 1, wherein the processing circuit is further adapted to:
   send at least a part of the second portion of the uplink transmission on the second PUCCH simultaneous to sending at least a part of the first portion of the uplink transmission on the first PUCCH.

3. The scheduled entity of claim 1, wherein the processing circuit adapted to send the uplink transmission utilizing two or more PUCCHs of the regular burst period of the subframe comprises the processing circuit adapted to:
   send an uplink transmission on a first PUCCH associated with a first frequency band; and
   simultaneously send an uplink transmission on a second PUCCH associated with a second frequency band.

4. The scheduled entity of claim 1, wherein the processing circuit is further adapted to:
   determine whether a size of the payload is less than a first threshold, greater than or equal to the first threshold and less than or equal to a second threshold, or greater than the second threshold;
   employ a first frame structure, a first error code, or both the first frame structure and the first error code in response to determining the size of the payload is less than the first threshold;
   employ a second frame structure, a second error code, or both the second frame structure and the second error code in response to determining the size of the payload is greater than or equal to the first threshold and less than or equal to the second threshold; and
   employ a third frame structure, a third error code, or both the third frame structure and the third error code in response to determining the size of the payload is greater than the second threshold.

5. The scheduled entity of claim 4, wherein the processing circuit adapted to employ the first frame structure in response to determining the size of the payload is less than the first threshold comprises the processing circuit adapted to:
   employ the first frame structure with a number of reference signal (RS) symbols that approximates a number of data symbols.

6. The scheduled entity of claim 1, wherein the processing circuit adapted to send the uplink transmission utilizing two or more PUCCHs of the regular burst period of the subframe comprises the processing circuit adapted to:
   send the uplink transmission as a coherent transmission including a predetermined sequence of reference signal (RS) symbols and data symbols.

7. The scheduled entity of claim 1, wherein the processing circuit adapted to send the uplink transmission utilizing two or more PUCCHs of the regular burst period of the subframe comprises the processing circuit adapted to:
   send the uplink transmission as a non-coherent transmission.

8. The scheduled entity of claim 1, wherein the uplink transmission utilizing two or more PUCCHs of the regular burst period of the subframe comprises:
   a plurality of reference signal (RS) symbols in alternating format with a plurality of data symbols.

9. The scheduled entity of claim 1, wherein the uplink transmission utilizing two or more PUCCHs of the regular burst period of the subframe comprises:
   a plurality of reference signal (RS) symbols grouped together and a plurality of data symbols grouped together.

10. The scheduled entity of claim 1, wherein at least one symbol of the first symbols and one symbol of the last symbols overlap.

11. The scheduled entity of claim 1, the first symbols and the last symbols are data symbols.

12. A method of wireless communication, comprising:
obtaining a payload for an uplink transmission on a physical uplink control channel (PUCCH);
sending a first portion of the uplink transmission including first symbols of the payload on a first PUCCH associated with a first frequency band of a regular burst period to a scheduling entity;
switching to a second PUCCH associated with a second frequency band of the regular burst period; and
sending a second portion of the uplink transmission including last symbols of the payload on the second PUCCH to the scheduling entity.

13. The method of claim 12, further comprising:
sending at least a portion of the second portion of the uplink transmission on the second PUCCH simultaneous to sending at least a portion of the first portion of the uplink transmission on the first PUCCH.

14. The method of claim 12, wherein sending the uplink transmission utilizing two or more PUCCHs of the regular burst period of the subframe comprises:
sending an uplink transmission on a first PUCCH associated with a first frequency band; and
simultaneously sending an uplink transmission on a second PUCCH associated with a second frequency band.

15. The method of claim 12, further comprising:
determining whether a size of the payload is less than a first threshold, greater than or equal to the first threshold and less than or equal to a second threshold, or greater than the second threshold;
employing a first frame structure, a first error code, or both the first frame structure and the first error code in response to determining the size of the payload is less than the first threshold;
employing a second frame structure, a second error code, or both the second frame structure and the second error code in response to determining the size of the payload is greater than or equal to the first threshold and less than or equal to the second threshold; and
employing a third frame structure, a third error code, or both the third frame structure and the third error code in response to determining the size of the payload is greater than the second threshold.

16. The method of claim 12, wherein sending the uplink transmission utilizing two or more PUCCHs of the regular burst period of the subframe comprises:
sending the uplink transmission as a coherent transmission including a predetermined sequence of reference signal (RS) symbols and data symbols.

17. The method of claim 12, wherein sending the uplink transmission utilizing two or more PUCCHs of the regular burst period of the subframe comprises:
sending the uplink transmission as a non-coherent transmission.

18. The method of claim 12, further comprising:
creating known reference signal (RS) tones for channel estimates utilizing a base sequence multiplied with different orthogonal covers or with phase ramping.

19. The method of claim 12, wherein at least one symbol of the first symbols and one symbol of the last symbols overlap.

20. A scheduling entity, comprising:
a transceiver;
a memory; and
a processing circuit coupled to the transceiver and the memory, the processing circuit adapted to:
receive via the transceiver an uplink transmission including first symbols of a payload from a scheduled entity on a first physical uplink control channel (PUCCH) of a regular burst period of a subframe; and
receive via the transceiver an uplink transmission including last symbols of the payload from the scheduled entity on at least a second PUCCH of the regular burst period of the subframe;
wherein the first PUCCH and the second PUCCH are associated with respectively different frequency bands of the regular burst period of the subframe.

21. The scheduling entity of claim 20, wherein the processing circuit is further adapted to:
send a downlink transmission to the scheduled entity, the downlink transmission adapted to specify a particular base sequence multiplied with different orthogonal covers or with phase ramping to be utilized by the scheduled entity for creating known reference signal (RS) tones for channel estimates.

22. The scheduling entity of claim 20, wherein at least a portion of the uplink transmission on the first PUCCH is received simultaneous to receiving at least a portion of the uplink transmission on the second PUCCH.

23. The scheduling entity of claim 20, wherein the received uplink transmissions on the first PUCCH and the second PUCCH comprises a number of reference signal (RS) symbols approximating a number of data symbols.

24. The scheduling entity of claim 20, wherein the received uplink transmissions on the first PUCCH and the second PUCCH comprise coherent transmissions including a predetermined sequence of reference signal (RS) symbols and data symbols.

25. The scheduling entity of claim 20, wherein the received uplink transmissions on the first PUCCH and the second PUCCH comprise non-coherent transmissions.

26. The scheduling entity of claim 20, wherein the received uplink transmissions on the first PUCCH and the second PUCCH comprise a plurality of reference signal (RS) symbols in alternating format with a plurality of data symbols.

27. The scheduling entity of claim 20, wherein the received uplink transmissions on the first PUCCH and the second PUCCH comprise a plurality of reference signal (RS) symbols grouped together and a plurality of data symbols grouped together.

28. A method of wireless communication, comprising:
receiving an uplink transmission including first symbols of a payload from a scheduled entity on a first physical uplink control channel (PUCCH) of a regular burst period of a subframe; and
receiving an uplink transmission including last symbols of the payload from the scheduled entity on at least a second PUCCH of the regular burst period of the subframe;
wherein the first PUCCH and the second PUCCH are associated with respectively different frequency bands of the regular burst period of the subframe; and
sending a downlink transmission to the scheduled entity, wherein the downlink transmission is adapted to specify a particular base sequence multiplied with different orthogonal covers or with phase ramping to be utilized by the scheduled entity for the uplink transmission on the first PUCCH and on the second PUCCH for creating known reference signal (RS) tones for channel estimates.

29. The method of claim 28, wherein at least a portion of the uplink transmission on the first PUCCH is received simultaneous to receiving at least a portion of the uplink transmission on the second PUCCH.

30. The method of claim 28, wherein the received uplink transmissions on the first PUCCH and the second PUCCH comprise a number of reference signal (RS) symbols approximating a number of data symbols.

* * * * *